United States Patent [19]

Kondziola

[11] 4,427,163
[45] Jan. 24, 1984

[54] DUAL-SPOOL RETRACTOR FOR SEAT BELTS

[75] Inventor: Joseph D. Kondziola, Troy, Mich.

[73] Assignee: General Motors Corporation, Detroit, Mich.

[21] Appl. No.: 396,857

[22] Filed: Jul. 9, 1982

[51] Int. Cl.$^3$ .................. A62B 35/00; B65H 75/48
[52] U.S. Cl. ................................ 242/107; 185/37
[58] Field of Search .......... 242/107, 107.4 R–107.4 E, 242/107.5; 267/156; 280/803, 804, 806–808; 185/37, 45; 297/475–478

[56] References Cited

U.S. PATENT DOCUMENTS

| | | | |
|---|---|---|---|
| 3,342,998 | 9/1967 | Anderson | 185/37 X |
| 3,817,472 | 6/1974 | Abe | 242/107 |
| 4,147,387 | 4/1979 | Coenan | 242/107 X |
| 4,253,620 | 3/1981 | Takei et al. | 242/107 |
| 4,290,628 | 9/1981 | Okuyama | 280/803 |

Primary Examiner—John M. Jillions
Attorney, Agent, or Firm—Donald F. Scherer

[57] ABSTRACT

A seat belt retractor has a single spring arrangement for a dual belt system. The spring is connected between two drum members which are respectively connected to one seat belt and one member of an epicyclic gear mechanism. The other two members of the epicyclic gear mechanism are connected to the other seat belt and the other drum member, respectively. Extension of either or both seat belts results in the spring being transferred from one drum to the other resulting in a force differential between the drums. Retraction of the belt or belts is enforced by the spring returning to the as assembled position on the drums to relieve the force differential. The epicyclic gear mechanism is operable to drive one drum at a higher rate of speed than the other drum independently of which seat belt is extended.

3 Claims, 3 Drawing Figures

DUAL-SPOOL RETRACTOR FOR SEAT BELTS

This invention relates to seat belt retractors and more particularly to dual seat belt retractors having a single spring member for sole or joint belt movement.

Vehicle restraint systems and passive type restraint systems in particular, will generally have a centrally located seat belt retractor mechanism housed between the front seat occupants. The seat belt mechanisms are generally operated by a spring motor and in most instances, have a spring motor for each seat belt. Generally, the use of separate spring motors requires a larger storage space such that the expansion of the springs can be accommodated.

The present invention provides a single spring motor which has independently operable rotary members for providing spring storage. These spring storage members are interconnected through an epicyclic gear mechanism and are operatively connected to the seat belts. These operative connections provide that one of the storage members will always rotate at a speed more rapid than the seat belt extension speed such that a portion of the spring will be transferred between the storage drums. This results in a force storage or accumulation which is operable to retract the seat belt which has been extended when the extension force is removed.

It is therefore an object of this invention to provide an improved seat belt retractor wherein a single spring member is operable through an epicyclic gear mechanism to provide the retraction force for two separately operable belt members.

It is another object of this invention to provide an improved dual seat belt retractor wherein an epicyclic gear mechanism provides a speed differential between storage members of a single retraction spring and a high restoring torque for seat belt retraction regardless of whether the seat belts are operated singly or jointly.

It is a further object of this invention to provide an improved dual seat belt retraction mechanism having a single retractor spring including an epicyclic gear set having the sun gear thereof connected to one spring storage drum, the carrier thereof connected to one belt storage reel and the ring gear thereof connected through a gear train to the other spring storage drum and belt storage reel such that extension of either or both seat belts results in the transfer of a portion of the spring from one storage drum to the other so that a restoring force for seat belt retraction is accumulated on the other storage drum.

These and other objects and advantages of the present invention will be more apparent from the following description and drawings in which.

Figure 1:
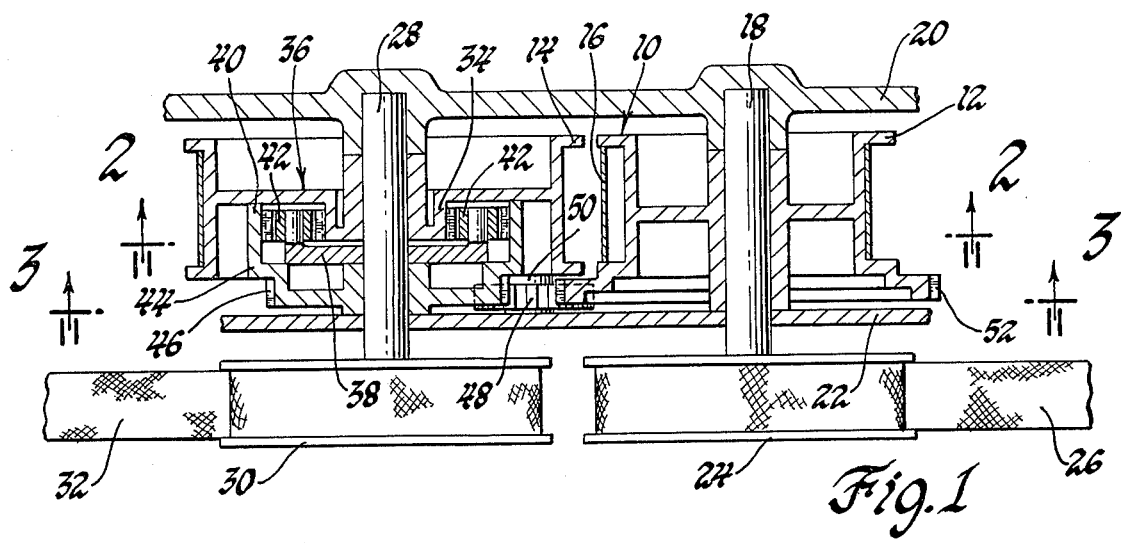
FIG. 1 is a top view partially in section showing a seat belt retraction mechanism.
Figure 2:
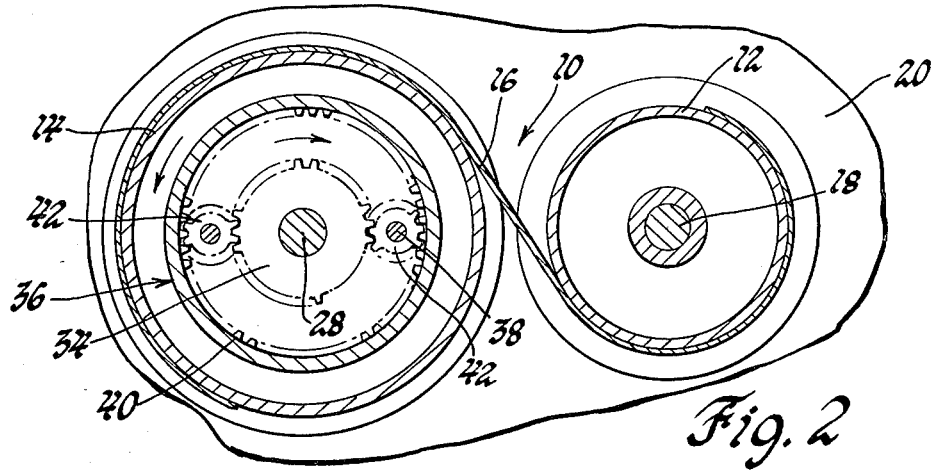
FIG. 2 is a sectional view taken along line 2—2 of FIG. 1.

Referring to the drawings, wherein like characters represent the same or corresponding parts throughout the several views there is seen, particularly in FIGS. 1 and 2, a spring motor generally designated 10. The spring motor 10 includes a pair of spring storage drums 12 and 14 which are interconnected by a spring member 16. The spring member 16 is preferably a constant force type of monotonic spring. Such springs exhibit the characteristic that the force restoring spring is maintained at a constant level regardless of the volume of spring which is transferred between the storage drums. Such springs are well-known and commercially available. Only a single wrap of the spring 16 is shown for convenience. It will be appreciated by those skilled in the art that the length of spring 16 is determined by the amount of belt extension or the number of revolutions of the spring motor which are required to satisfy full seat belt extension.

The drum 12 is rotatably secured to a shaft 18 which is rotatably supported in a pair of housing walls 20 and 22. As seen in FIG. 1, the shaft 18 extends through wall 22 and is connected for rotation with a seat belt storage reel 24 on which is disposed a conventional seat belt 26. Thus, the storage reel 24 and storage drum 12 will rotate in unison whenever seat belt 26 is extended or retracted.

The storage drum 14 is rotatably supported on a shaft 28 which is rotatably supported in the walls 20 and 22. The shaft 28 has drivingly connected therewith a belt storage reel 30 on which is disposed a seat belt 32. The storage reel 30 and storage drum 14 can revolve independently of each other since the drum 14 is not directly connected with the shaft 28. The seat belts 26 and 32 are conventional seat belts and may be utilized in passive restraint systems with known storage reel mechanisms such as those shown in U.S. Pat. No. 4,245,798 issued to Steger on Jan. 20, 1981, and assigned to the assignee of this application, and U.S. Pat. No. 4,264,091 issued to Lee on Apr. 28, 1981, and assigned to the assignee of this application. There are many other well-known belt storage mechanisms which can be utilized in the present system.

The storage drum 14 has formed thereon or otherwise secured thereto a sun gear 34 which is a component of an epicyclic gear mechanism, generally designated 36 and best seen in FIGS. 1 and 2. The epicyclic gear mechanism 36 also includes a carrier member 38 and a ring gear 40. The carrier member 38 has rotatably disposed thereon a plurality of planet pinions 42 which mesh with sun gear 34 and ring gear 40 in a well-known manner. The carrier 38 is secured for unitary rotation with shaft 28 while the ring gear 40 is rotatably journalled on the shaft 28.

Figure 3:
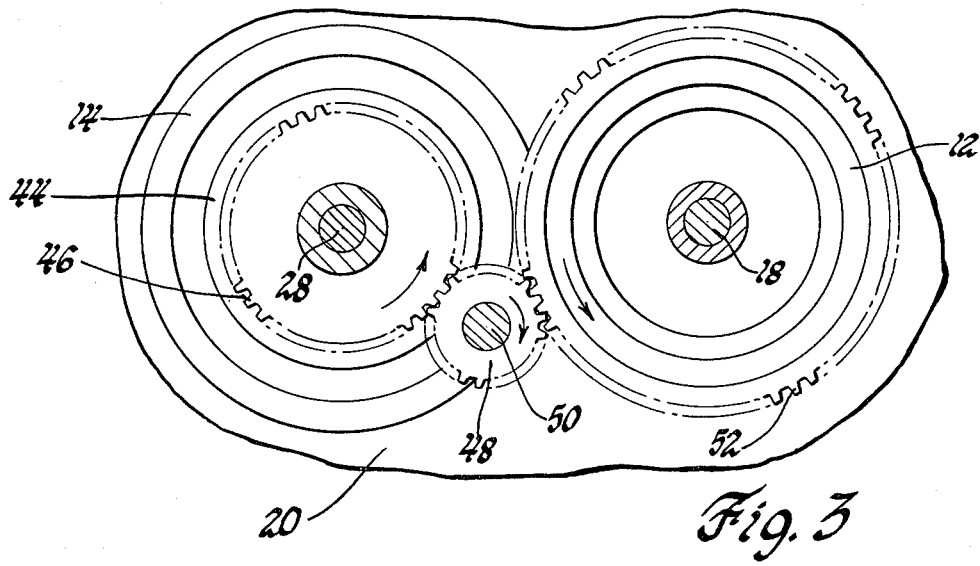
FIG. 3 is a sectional view taken along line 3—3 of FIG. 1.

The ring gear 40 has an integral hub member 44 which provides the rotatable support on shaft 28 and has formed thereon a gear member 46. As best seen in FIGS. 1 and 3, the gear member 46 meshes with an idler gear 48 which is rotatably supported on a shaft 50. The idler gear 48 meshes with a gear member 52 which is formed integrally with or otherwise secured to storage drum 12. Because of the gear train 46, 48, 52, ring gear 40 and storage drum 12 will rotate in unison. The rotary speed of the respective members 12 and 40 will be determined by the gear ratio established by the number of teeth on their respective gears 52 and 46.

If the seat belt 26, and therefore storage reel 24, storage drum 12 and gear 52 are held stationary while the other seat belt 32 is extended, the carrier 38 will be rotated in a clockwise direction as seen in FIG. 2. The ring gear 40 will remain stationary because gear 52 is stationary and therefore sun gear 34 will be rotated at a speed greater than the rotary speed of storage reel 30 due to the overdrive gear ratio established in the epicyclic gear mechanism 36. Since the sun gear 34 and storage drum 14 rotate in unison, a portion of the spring 16 will be transferred from storage drum 14 to storage drum 12 which is stationary. The transfer of this portion of spring 16 results in a restoring force being accumulated on drum 12 which is operable to rotate the drum 14 and sun gear 34 in a counterclockwise direction when the extension force on belt 32 is released.

During retraction of seat belt 32, an underdrive speed ratio is present in the epicyclic gear mechanism 36 which, as is well-known, results in a torque increase between the input and output members. Thus, the stored spring force is multiplied by the epicyclic gear ratio before acting to retract seat belt 32 permitting a lower spring force to be used.

If seat belt 32 is held stationary while seat belt 26 is extended, the carrier 38 will be held stationary. During the extension of seat belt 26, storage drum 12 and therefore gear 52 will be rotatd counterclockwise as viewed in FIG. 3. Due to idler gear 48, gear 46, and therefore ring gear 40, will be rotated counterclockwise. Since carrier 38 is stationary, the sun gear 34, and therefore drum 14, will be rotated clockwise at a rotary speed greater than the rotary speed of ring gear 40. Since gear 52 is larger in diameter than gear 46, the ring gear 40 is rotated more rapidly than the storage drum 12. Thus, the storage drum 14 is rotated more rapidly than storage drum 12 which results in a transfer of a portion of spring 16 to storage drum 12. The transfer of spring 16 to storage drum 12 results in a force in the spring which seeks to return the spring 16 to storage drum 14.

If the extension force upon belt 26 is removed, the spring in returning to storage drum 14 will cause rotation of storage drum 14 and therefore sun gear 34. Sun gear 34 rotating counterclockwise will drive ring gear 40 clockwise which will result in clockwise rotation of gear 52 and drum 12 such that seat belt 26 will be retracted on storage reel 24. A force or torque multiplication is also present during retraction of belt 26.

If both seat belts 26 and 32 are extended simultaneously or separately, the portion of spring 16 transferred from drum 14 to drum 12 will be equal to the sum of the portions of spring 16 which is transferred during individual extension of the seat belts 26 and 32. In other words, drum 14 will be rotated a predetermined amount relative to drum 12 for the extension of seat belt 32 and for the extension of seat belt 26 regardless of whether these extensions occur simultaneously or successively.

By way of example, the following values are given for the number of teeth on the gears:
Sun Gear 34—32 Teeth
Ring Gear 40—48 Teeth
Gear 46—48 Teeth
Gear 52—80 Teeth Each of the pinions 42 will have eight teeth while the number of teeth on idler gear 48 can be whatever value is necessary to fill the space between the gears 52 and 46. With the foregoing values, when the ring gear 40 is stationary and carrier 38 is rotated, the sun gear 34 will rotate at $2\frac{1}{2}$ times the speed of carrier 38. If the carrier 38 is held stationary, the sun gear 34 will rotate at $2\frac{1}{2}$ times the speed of gear 52.

If both carrier 38 and gear 52 are rotated in unison at the same speed, the sun gear 34 will rotate at five times the speed of either carrier 38 or gear 52. If the belts 26 and 32 are operated jointly but at different speeds, the sun gear 34 will rotate at $2\frac{1}{2}$ times the rotary speed induced by belt 32 plus $2\frac{1}{2}$ times the rotary speed induced by belt 26.

In any event, the number of turns of drum 14 relative to drum 12 will be either 2.5 times more or five times more depending upon whether seat belts 26 and 32 are operated singly or jointly. The number of revolutions and the speed of storage drum 14 can be controlled by the number of teeth on the gear members. The above gear ratios are given by way of example, and are not meant to be limiting in the speed differential or spring transfer amount that can be achieved with the present invention.

In the alternative, a more conventional monotonic spring arrangement can be used wherein the drum 12 is free to rotate relative to shaft 18 and gear 52. In this instance the drum 12 is only a storage drum and the spring force operates only through drum 14.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A seat belt retractor assembly for a dual belt system comprising; a first rotatable shaft and belt storage member; a second rotatable shaft and belt storage member; a first drum rotatably supported on said first shaft; a second drum drivingly connected with the second rotatable shaft; a spring member operatively connected between said first and second drums and cooperating therewith to provide a spring motor; and an epicyclic gear mechanism including a sun gear rotatable with said first drum, a ring gear rotatably supported on said first shaft and drivingly connected with said second drum, a gear carrier secured for rotation with said first shaft and a plurality of pinion gears rotatably supported on said gear carrier and meshing with said sun gear and ring gear, said first shaft being rotated by extension of the belt connected with said first storage member, said second shaft being rotated by extension of the belt connected to said second storage member, said first drum member undergoing a different number of revolutions than either shaft when one or both belts are extended to wrap the spring member on the first drum to provide a spring force which will enforce retraction of one or both of the extended belts on its respective storage member.

2. A seat belt retractor for a dual belt mechanism comprising; a pair of seat belt storage reels; an epicyclic gear mechanism having a sun gear, a ring gear, and a carrier having at least one planet gear in meshing engagement with the sun and ring gears with the carrier being connected to one of said storage reels and the ring gear being operatively connected with the other storage reel; and a spring motor means connected between said sun gear and said other storage reel and including a respective component connected to each said sun gear and said storage reel, extension of either or both of said belts being effective to cause rotation of said sun gear to transfer a portion of the spring of said spring motor to the component connected to said storage reel to establish a restoring torque for belt retraction.

3. A dual seat belt retractor having a single spring motor comprising; a spring motor having a pair of spring storage drums and a spring extending between said drums and being transferable between the drums upon drum rotation to accumulate a restoring force; a pair of seat belt storage reels one of which is connected with one of said spring storage drums; and an epicyclic gear means drivingly connected between said one belt storage reel and said other belt storage reel and between both said belt storage reels and said other spring storage drum, said other storage drum being rotated in one direction to transfer said spring to said one storage drum whenever one or both seat belts are extended with the rotary speed of the other storage drum being greater than the retraction speed of either of said belt storage reels, and said spring being returned to said other storage drum to enforce seat belt retraction with torque established at said other storage drum being multiplied by said epicyclic gear means upon transmission thereof to the belt storage reel being retracted.

* * * * *